(12) United States Patent
Wei Siao

(10) Patent No.: US 8,667,910 B2
(45) Date of Patent: Mar. 11, 2014

(54) TABLE FURNITURE ASSEMBLING STRUCTURE

(75) Inventor: Jhen-Siang Wei Siao, Taipei (TW)

(73) Assignee: Chingdar Enterprise Co., Ltd., New Taipei (TW)

( * ) Notice: Subject to any disclaimer, the term of this patent is extended or adjusted under 35 U.S.C. 154(b) by 11 days.

(21) Appl. No.: 13/404,355

(22) Filed: Feb. 24, 2012

(65) Prior Publication Data

US 2013/0220188 A1 Aug. 29, 2013

(51) Int. Cl.
*A47B 3/06* (2006.01)

(52) U.S. Cl.
USPC ........................................... 108/155

(58) Field of Classification Search
USPC ............ 108/147.12–147.15, 153.1, 155, 156, 108/157.1, 158.11, 158.12
See application file for complete search history.

(56) References Cited

U.S. PATENT DOCUMENTS

| | | | |
|---|---|---|---|
| 3,347,509 A * | 10/1967 | Blink et al. | 248/188.7 |
| 5,291,708 A * | 3/1994 | Johnson | 52/282.2 |
| 6,450,107 B1 * | 9/2002 | Sanz Novales | 108/153.1 |
| 6,729,244 B2 * | 5/2004 | Cattaneo | 108/155 |
| 7,086,341 B2 * | 8/2006 | Peddicord | 108/180 |
| 7,886,674 B2 * | 2/2011 | Behnke | 108/150 |
| 8,316,781 B1 * | 11/2012 | Majors | 108/158.12 |
| 2003/0167982 A1 * | 9/2003 | Yang | 108/155 |

* cited by examiner

*Primary Examiner* — Matthew Ing
(74) *Attorney, Agent, or Firm* — Rosenberg, Klein & Lee

(57) ABSTRACT

A table furniture mainly comprises a table plate, four leg units mounted at four end corners of the table plate, two couplers and a central beam. Each leg unit has a leg rod and a side bracket connected with the leg rod, an engaging portion being provided at its free end. The coupler has at least three insertion slots with shrunk openings among which two opposing insertion slots are for engagement with the engaging portions of both adjacent leg units. The central beam also has an engaging portion provided at each end for engagement with one insertion slot of the couplers adjacent to the two opposing insertion slots. In this manner, the structure can facilitate assembling and disassembling of the whole table.

3 Claims, 7 Drawing Sheets

TABLE FURNITURE ASSEMBLING STRUCTURE

BACKGROUND OF INVENTION

1. Field of the Invention

The present invention relates to a table furniture assembling structure, more particularly to a table furniture which enables significant reduction of bulk volume of table and enables simplified assembling and disassembling of the table to facilitate transportation and storage.

2. Brief Description of Prior Art

Table is the most commonly used furniture facility in daily life. In addition to indoor use, table is also an indispensable equipment for outdoor barbeque, display of goods or booth furnishing. With respect to generally rectangular or square table, a table plate is mainly provided and four table legs are respectively provided to extend downwardly from the bottom end corners of the table plate. In order that the table legs can support the table plate in stable manner, additional reinforcement rods are provided to connect between the table legs and welding method is usually adopted to fix the table plate, the table legs and the reinforcement rods together. However, the table with welding for fixing is quite troublesome in transportation, and the table often occupies a lot of space when in unused condition.

In view of the negative affection on transportation and storage from undetachable structure of the conventional table, the relevant industries have proposed many improved table with collapsible legs. This table structure frequently seen in the market has its legs designed in cross intersection type with the intersection points as the pivot centers, so that the intersected legs can be either unfolded to become use state or folded to become storage state. However, as the legs after folding are overlain onto the underside of the table plate, the bottom face of the table becomes irregular so that the tables cannot be garnered in stack manner. In addition, as the legs after folding are not fastened in place, it is easy for the legs to become loosened and unfolded during transportation. This is the disadvantage frequently seen in practical implementation.

SUMMARY OF INVENTION

In view of the above facts, the inventor of the present invention proposes an improved table furniture according to his abundant experience in product development and manufacturing in relevant field. The object of the invention is to provide a table furniture which enables significant reduction of bulk volume of table furniture and enables simplified assembling and disassembling of the table to facilitate transportation and storage.

In order to achieve the above object, the table furniture comprises a table plate, four leg units, two couplers in a cubic shape, and a central beam. The four leg units are respectively mounted at four end corners of a table plate, and each leg unit has a leg rod and a side bracket connected with the leg rod, an engaging portion being provided at its free end. The coupler has at least three insertion slots with shrunk openings, in which two opposing insertion slots are for engagement with the engaging portions of both adjacent leg units. The central beam has an engaging portion provided at each end for engagement with one insertion slot of the couplers adjacent to the two opposing insertion slots. In this manner, by engaging/disengaging the engaging portions of the side brackets and the central beam with/from the insertion slots having shrunk openings, the assembly/disassembly of the leg units and the table plate can be achieved. In disassembled state, the table plate, the leg units and the central beam can be separately stored so that there are no such disadvantages of irregular bottom face of the table plate as happened in conventional structure. In addition, this invention can effectively reduce overall cost of transportation and storage of the table.

Furthermore, as the central beam of the present invention has engaging portions provided at both ends thereof, not only prompt assembly/disassembly of the central beam with the couplers can be achieved but also the engagement of the engaging portions of the central beam with the insertion slots of the couplers can increase the stability of the leg units.

DETAILED DESCRIPTION OF PREFERRED EMBODIMENTS

The objects, the technical contents and the expected effect of the present invention will become more apparent from the detailed description of the preferred embodiment in conjunction with the accompanying drawings.

Figure 1:
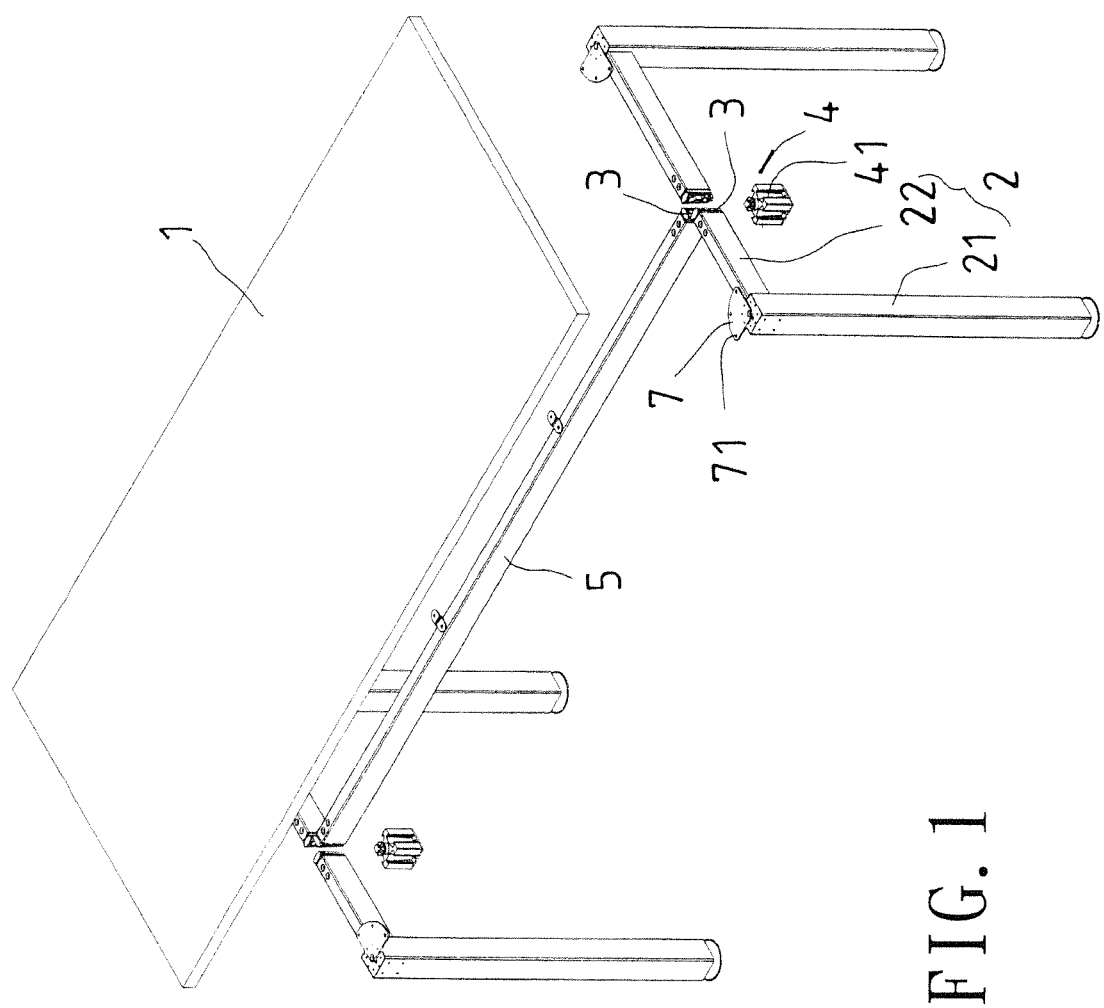
FIG. 1 is a perspective exploded view of the preferred embodiment of the present invention.
Figure 2:
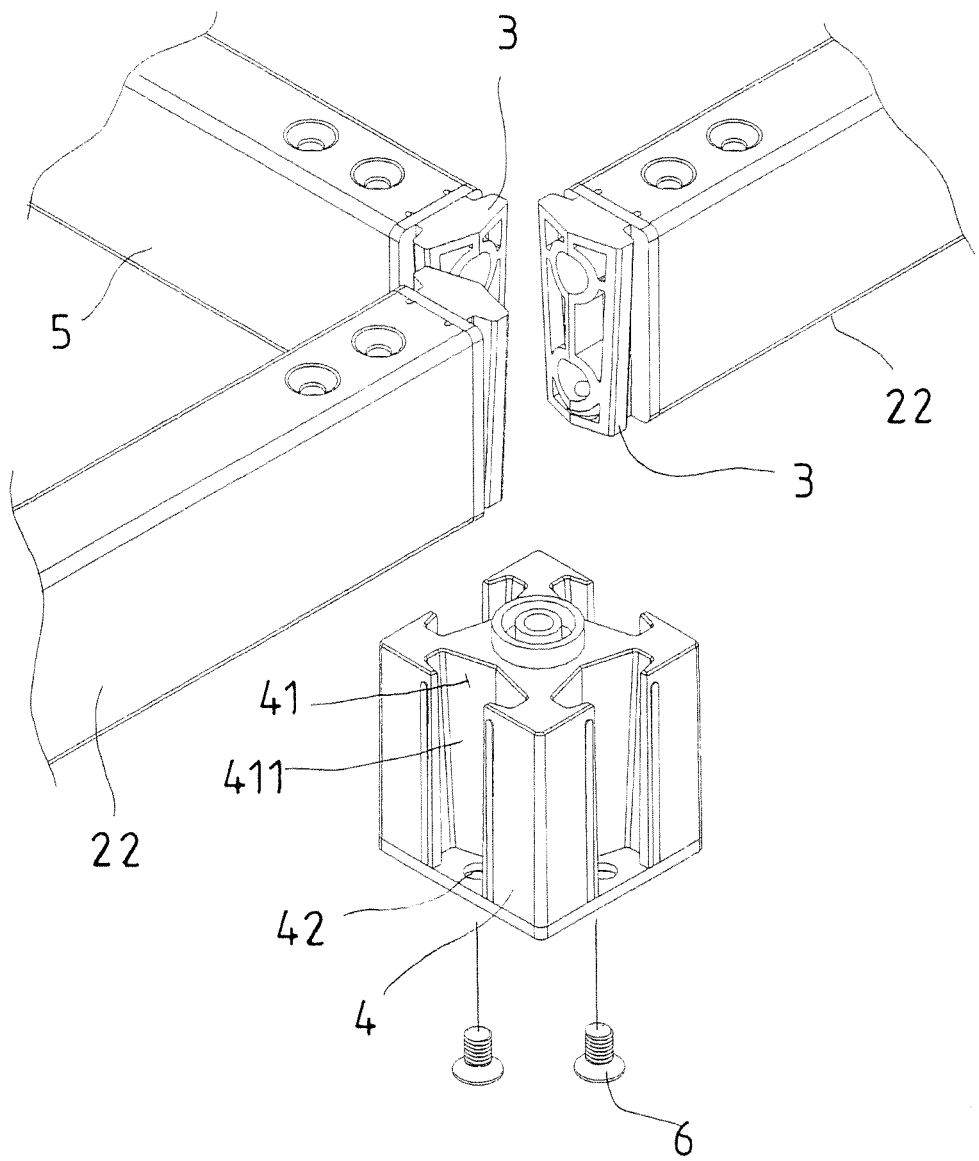
FIG. 2 is a perspective exploded view showing the appearance of the partially enlarged coupler of the preferred embodiment of the present invention.
Figure 3:
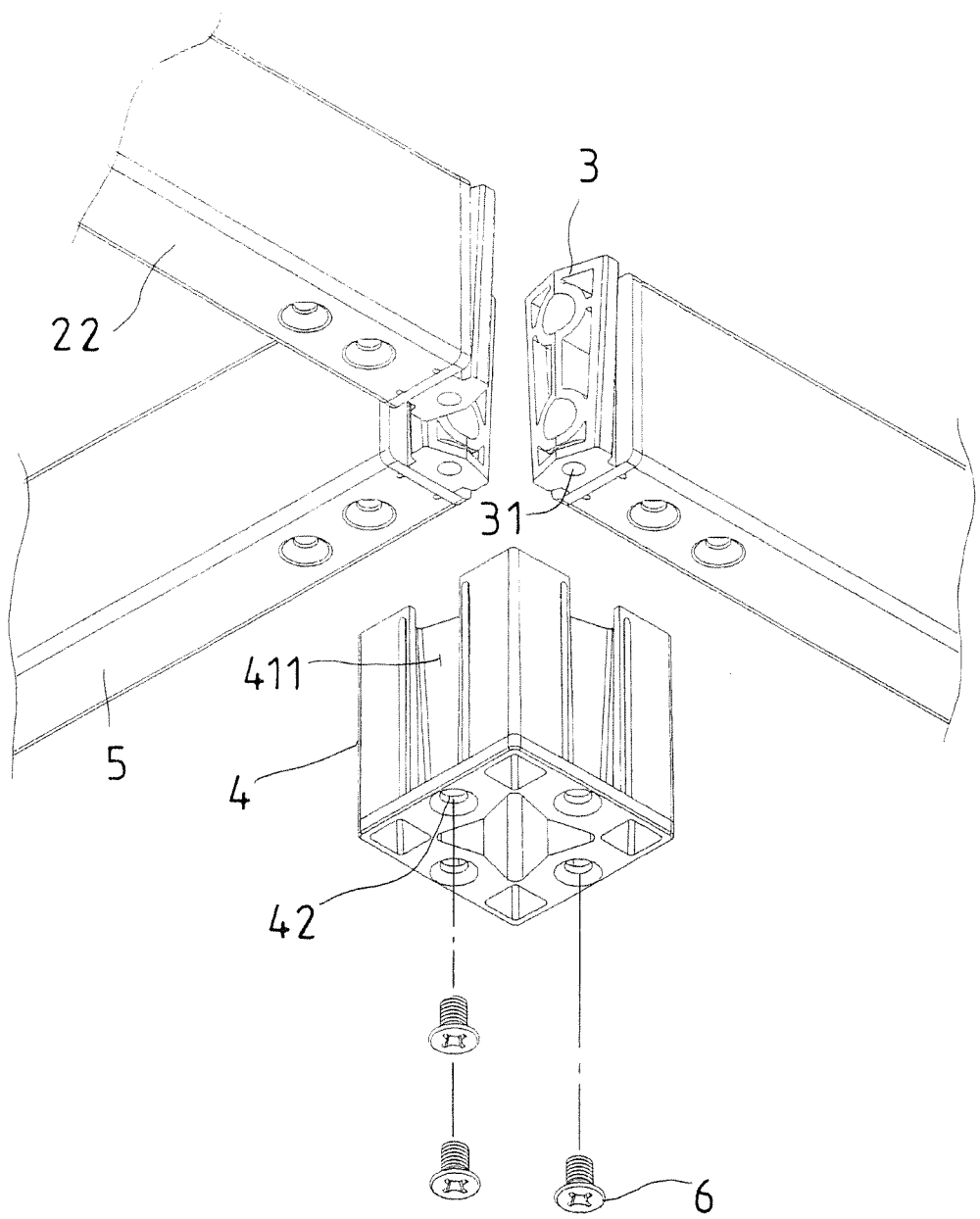
FIG. 3 is another perspective exploded view showing the appearance of the partially enlarged coupler of the preferred embodiment of the present invention, viewing from the other side.

Firstly referring to FIGS. 1 to 3, a preferred embodiment of the table furniture of the present invention is shown, in which the table furniture mainly comprises:

a table plate (1);

four leg units (2) mounted respectively at four end corners of a table plate (1), each leg unit (2) having a leg rod (21) and a side bracket (22) connected with the leg rod (21), an engaging portion (3) being provided at its free end;

two couplers (4), each having at least three insertion slots (41) with shrunk openings (411) among which two opposing insertion slots (41) are for engagement with the engaging portions (3) of both adjacent leg units (2). In this embodiment, the coupler (4) has a cubic shape;

a central beam (5) having an engaging portion (3) provided at each end thereof for engagement with one insertion slot (41) of the couplers (4) adjacent to the two opposing insertion slots (41).

Moreover, in this embodiment, each engaging portion (3) has a tapped hole (31) provided at its bottom face and the coupler (4) has a through hole (42) provided at the place corresponding to the tapped hole (31) so that the coupler (4) can be fastened to each engaging portion (3) by a fastening member (6) screwed through the through hole (42) into the corresponding tapped hole (31). Furthermore, a support plate (7) having a plurality of bores (71) provided thereon is fixed on the top end of each leg rod (21) and each leg rod (21) can be fastened to the bottom face of the table plate (1) by fastening members (6) screwed through the bores (71).

Figure 4:
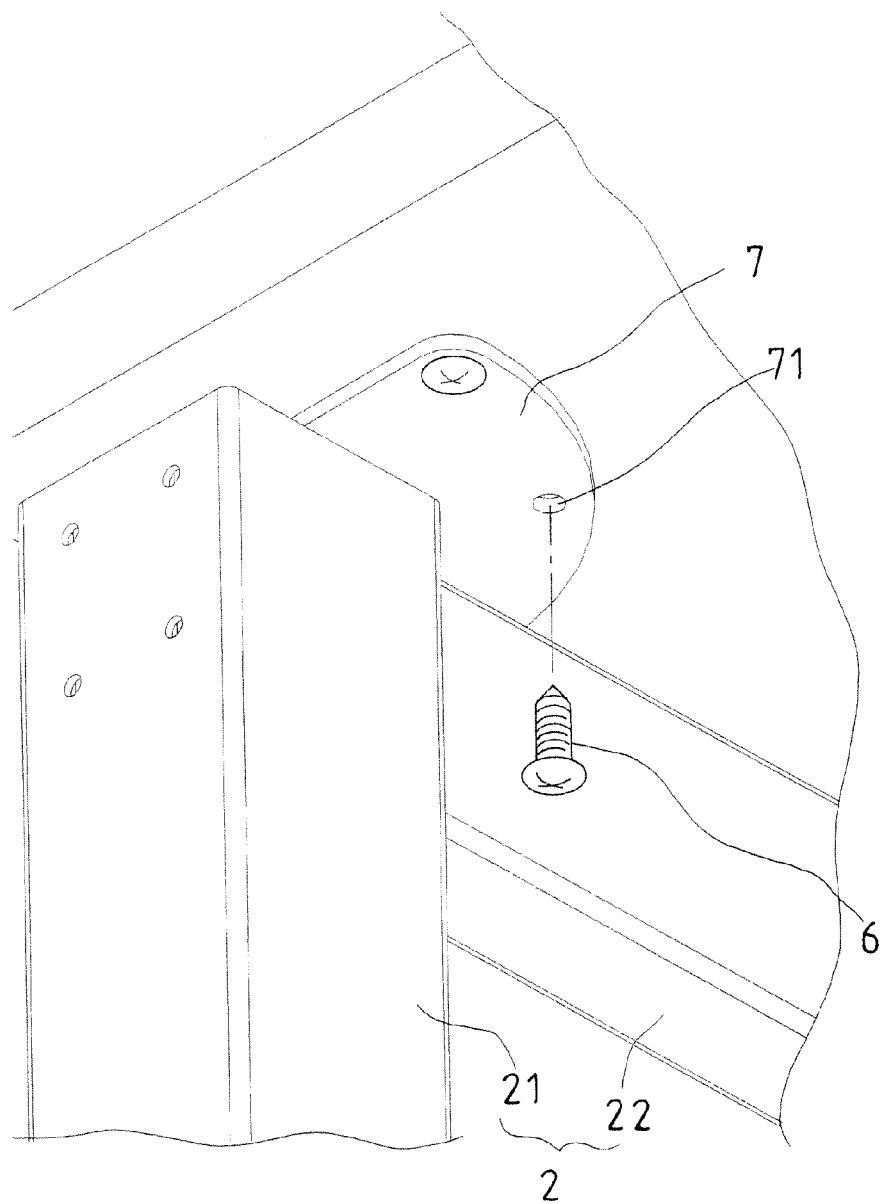
FIG. 4 is a partially enlarged perspective view of the preferred embodiment of the present invention, showing that a fastening member is screwed through the support plate so as to fix the leg rod onto the table plate.
Figure 5:
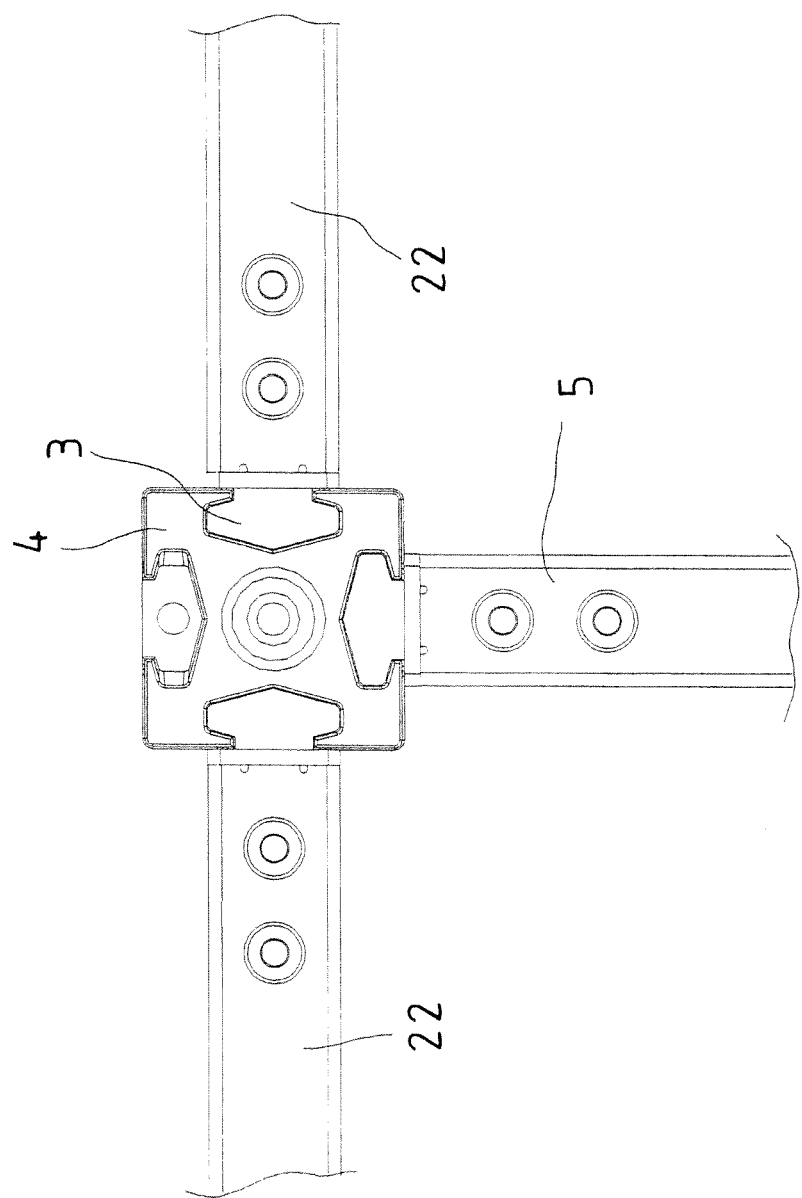
FIG. 5 is a partially enlarged top view of the preferred embodiment, showing the state of the coupler after assembly is finished.
Figure 6:
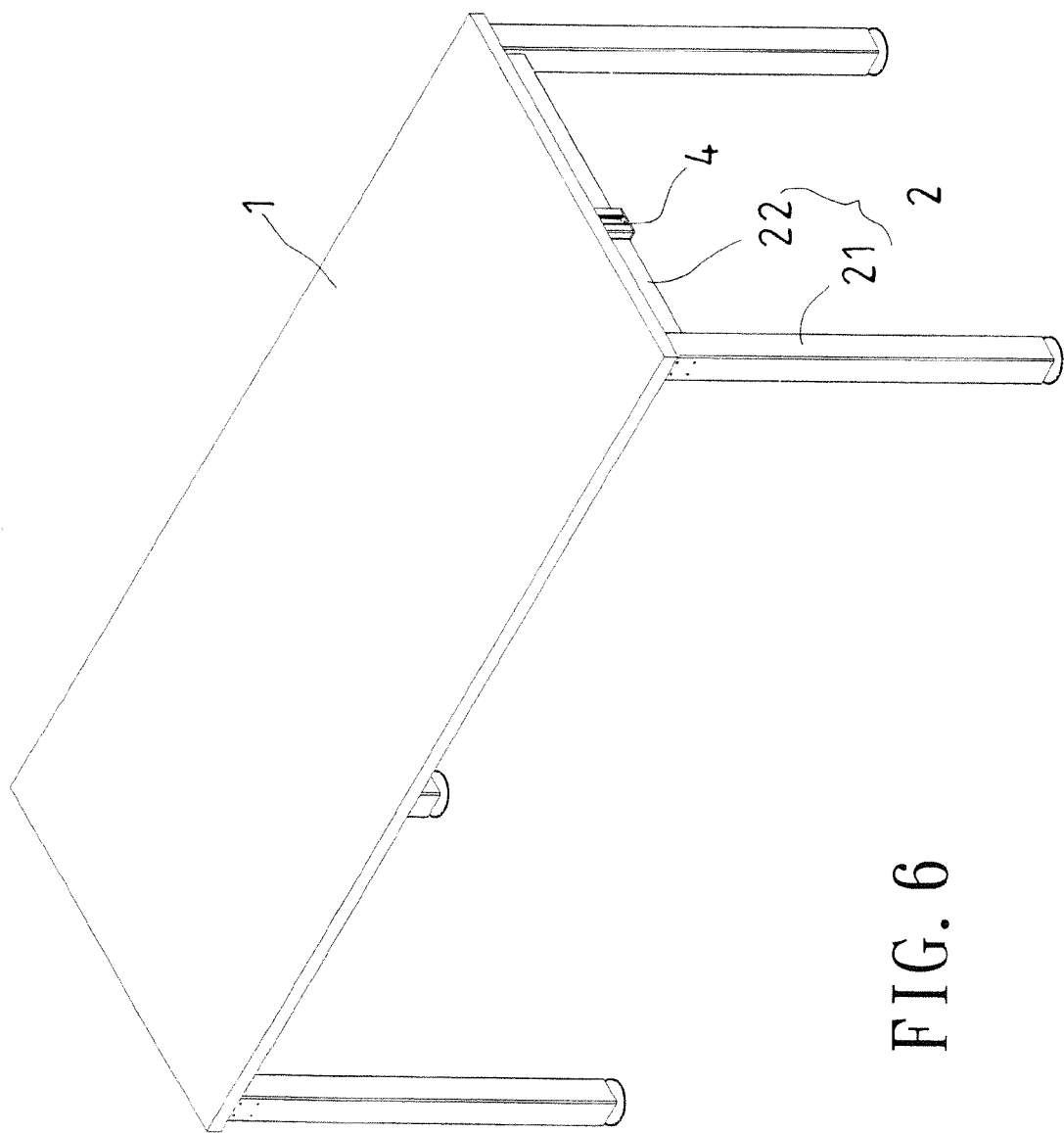
FIG. 6 is a perspective view showing the appearance of the preferred embodiment of the present invention after assembly is finished.
Figure 7:
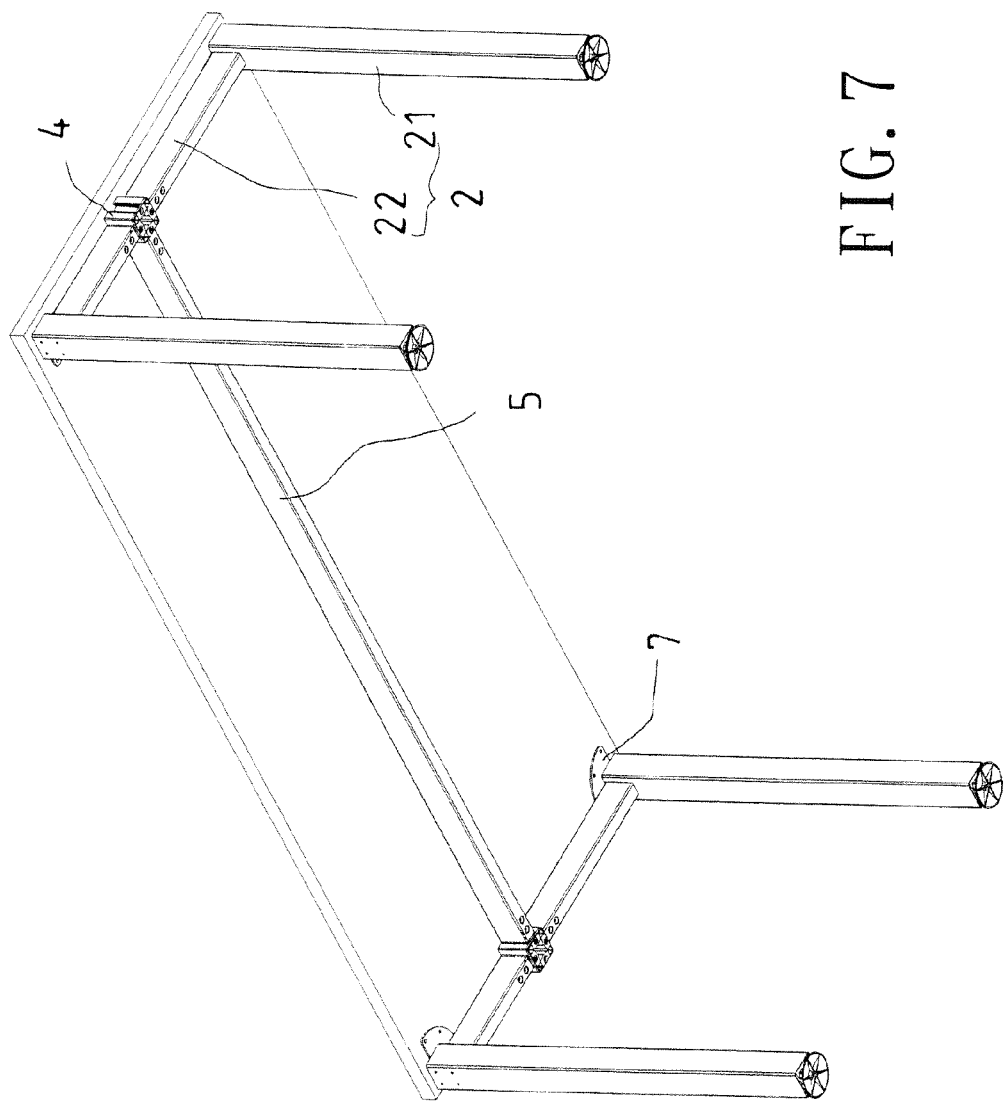
FIG. 7 is another perspective view showing the appearance of the preferred embodiment of the present invention viewing from the other side after assembly is finished.

When assembling the table furniture according to the present invention, as shown in FIGS. 4 and 5, the leg rod (21) of each leg unit (2) is firstly placed on one end corner at one side of the table plate (1) and the support plate (7) fixed on the leg rod (21) is rested on the bottom surface of the table plate (1). The side bracket (22) of the leg unit (2) is arranged to be parallel to the side edge of the table plate (1), then the leg rod (21) is fixed to the bottom surface of the table plate (1) by screwing the fastening members (6) through the bores (71) of the support plate (7). Next, the engaging portion (3) is inserted into one insertion slot (41) of the coupler (4). The shrunk opening (411) of the insertion slot (41) provides a lock function in horizontal direction for the corresponding engaging portion (3) when the engaging portion (3) is vertically engaged into the insertion slot (41). Then, a fastening member (6) is screwed into the corresponding tapped hole (31) by passing through the through hole (42) on the coupler (4). In turn, the other leg unit (2) of the same side is also assembled to the table plate (1) in the same procedure as above, and the assembly of both leg units (2) on one side of the table plate (1) is thus completed. Next, two leg units (2) can also be assembled on the other side of the table plate (1) in the same way as above. When the four leg units (2) are respectively mounted on the end corners of the table plate (1), the engaging portions (3) at both ends of the central beam (5) are respectively inserted into the corresponding insertion slots (41) of the couplers (4), then the fastening members (6) are screwed into the corresponding tapped holes (31) by passing through the through holes (42) on the couplers (4) so as to finish the assembly of the table furniture, as shown in FIGS. 6 and 7.

Similarly, when the table furniture is to be disassembled for garnering, the procedure can be conducted in a direction reverse to the assembly procedure as stated above, so that the table plate (1), the four leg units (2) and the central beam (5) can be separately garnered up, and the table plate (1) can be stacked in good order. Hence, irregularity happened on the surface of the table plate after folding of the leg units as prior art is diminished in the table furniture of this invention which enables significant reduction of bulk volume of table and enables simplified assembling and disassembling of the table to facilitate transportation and storage.

Based on foregoing, the table furniture of the present invention has the following advantages when comparing with prior art.

1. As the leg units are assembled to the table plate by means of the engagement of the engaging portions with the insertion slots of couplers, assembly/disassembly of the leg units on the table plate becomes very easy and convenient and the table plate, the leg units and the central beam can be separately stored so that there is no such disadvantages of irregular bottom face of the table as happened in conventional structure. In addition, the overall cost of transportation and storage of the table can be effectively reduced.

2. As the central beam of the present invention also has engaging portions provided at both ends thereof, not only prompt assembly/disassembly of the central beam with the couplers can be achieved but also the engagement of the engaging portions thereof with the insertion slots of the couplers can increase the stability of the leg units.

The above description and illustration is merely a preferred embodiment of the present invention, not intended to limit the scope of the present invention. Variations and modifications conducted by those who are skilled in the art without departing from the spirit and scope of the present invention are still regarded to be within the scope of the invention.

What is claimed is:

1. A table furniture, mainly comprising:
   a table plate;
   four substantially L-shaped leg units mounted respectively at four end corners of the table plate, each leg unit having a leg rod and a side bracket connected with the leg rod to extend transversely from a top portion thereof, an engaging portion being provided at a free end of each side bracket;
   two couplers, each having a cubic shape and at least a first, second, third and fourth insertion slot with shrunk openings, the first and second insertion slots being disposed on a pair of opposing faces of each coupler for engagement with the engaging portions of a pair of the leg units disposed on adjacent corners of the table plate, each of said couplers fixedly connected to a pair of side brackets of the respective pair of leg units at the respective engaging portions of said side brackets; and
   a central beam having an engaging portion provided at opposing ends thereof, each of the engaging portions of the central beam for engagement with the third insertion slot of the couplers between the first and second insertion slots, whereby the fourth insertion slot of each coupler is free for engagement with an engaging portion of a central beam of an adjacent table furniture.

2. The table furniture as claimed in claim 1, wherein each engaging portion has a tapped hole provided at its bottom face and the coupler has a through hole provided at a position corresponding to the tapped hole so that the coupler is fastened to each engaging portion by a fastening member screwed through the through hole into the corresponding tapped hole.

3. The table furniture as claimed in claim 1, wherein a support plate having a plurality of bores provided thereon is further fixed on a top end of each leg rod and each leg rod is fastened to a bottom face of the table plate by fastening members screwing through the bores.

* * * * *